(12) United States Patent
Tan et al.

(10) Patent No.: US 8,034,143 B2
(45) Date of Patent: Oct. 11, 2011

(54) CYCLONE

(75) Inventors: Zhongchao Tan, Calgary (CA); Zhimin Yu, Calgary (CA)

(73) Assignee: UTI Limited Partnership, Calgary (CA)

( * ) Notice: Subject to any disclaimer, the term of this patent is extended or adjusted under 35 U.S.C. 154(b) by 505 days.

(21) Appl. No.: 12/050,882

(22) Filed: Mar. 18, 2008

(65) Prior Publication Data
US 2009/0235823 A1 Sep. 24, 2009

(51) Int. Cl.
*B01D 45/12* (2006.01)
(52) U.S. Cl. ....... 55/459.1; 55/447; 55/385.4; 55/385.6; 55/428; 55/434.1; 55/434.2; 55/434.4; 55/435; 95/269; 95/271
(58) Field of Classification Search .......... 55/459.1, 55/447, 385.4, 385.6, 428, 434.1, 434.2, 55/434.4, 435; 95/269, 271
See application file for complete search history.

(56) References Cited

U.S. PATENT DOCUMENTS

| | | | |
|---|---|---|---|
| 2,087,789 A * | 7/1937 | Allardice | 55/415 |
| 2,165,946 A * | 7/1939 | Smith | 241/18 |
| 3,448,563 A | 6/1969 | Sobeck | |
| 3,520,114 A | 7/1970 | Pall et al. | |
| 3,590,560 A | 7/1971 | Pall et al. | |
| 3,611,679 A | 10/1971 | Pall | |
| 4,008,059 A | 2/1977 | Monson et al. | |
| 4,028,076 A * | 6/1977 | Fields | 55/394 |
| 4,578,199 A | 3/1986 | Peel et al. | |
| 4,714,541 A | 12/1987 | Buyan et al. | |
| 4,853,010 A * | 8/1989 | Spence et al. | 96/52 |
| 4,969,934 A * | 11/1990 | Kusik et al. | 95/270 |
| 4,971,603 A | 11/1990 | Prinsloo et al. | |
| 4,985,058 A | 1/1991 | Prinsloo et al. | |
| 5,496,394 A * | 3/1996 | Nied | 95/271 |
| 5,681,450 A * | 10/1997 | Chitnis et al. | 208/113 |
| 6,468,426 B1 | 10/2002 | Klass | |
| 6,576,029 B2 * | 6/2003 | West | 55/349 |

(Continued)

FOREIGN PATENT DOCUMENTS

CA 1 327 947 3/1994

(Continued)

OTHER PUBLICATIONS

"Cyclones," *Adapted from Air Pollution Control*, by C.D. Cooper & F.C. Alley, 1986, 9 pages.

(Continued)

*Primary Examiner* — Jason M Greene
*Assistant Examiner* — Dung H Bui
(74) *Attorney, Agent, or Firm* — Fulbright & Jaworski

(57) ABSTRACT

A cyclone includes a cylindrical housing and has an inner diameter D. An inlet is near a first end of the housing. A deflection member can be positioned within the first end or the second end of the housing, depending on whether the cyclone is uniflow or reverse flow. An outlet tube is positioned within and extends from a second end or the first end of the housing (depending on whether uniflow or reverse flow). A bunker is formed between the outlet tube and an inner wall of the housing in a uniflow design and between the deflection member and the housing in a reverse flow design, and collects particles separated from an inlet gas stream. A gap between the deflection member and the outlet tube has a length in the range of approximately 0.4*D to 0.8*D. The length of the bunker is approximately greater than or equal to 1.5*D.

20 Claims, 9 Drawing Sheets

U.S. PATENT DOCUMENTS

| | | | |
|---|---|---|---|
| 6,669,845 B2 | 12/2003 | Klass | |
| 6,673,133 B2 | 1/2004 | Sechrist et al. | |
| 6,686,752 B1* | 2/2004 | Heumann et al. | 324/700 |
| 6,797,026 B2 | 9/2004 | Sechrist et al. | |
| 6,837,912 B1* | 1/2005 | Heumann | 55/424 |
| 6,863,703 B2 | 3/2005 | Maryamchik et al. | |
| 7,070,637 B1 | 7/2006 | Zhang | |
| 7,162,770 B2 | 1/2007 | Davidshofer | |
| 7,182,803 B2* | 2/2007 | Stewart et al. | 95/269 |
| 7,282,074 B1* | 10/2007 | Witter | 55/300 |
| 7,288,202 B2* | 10/2007 | Maier | 210/784 |
| 7,357,824 B2* | 4/2008 | Hakola | 55/435 |
| 7,591,866 B2* | 9/2009 | Bose | 55/337 |
| 7,662,202 B2* | 2/2010 | Oh et al. | 55/459.1 |
| 2001/0054213 A1* | 12/2001 | Oh et al. | 15/353 |
| 2003/0200736 A1* | 10/2003 | Ni | 55/426 |
| 2005/0126394 A1* | 6/2005 | Reiling | 95/271 |
| 2005/0172815 A1 | 8/2005 | Betting et al. | |
| 2006/0096933 A1* | 5/2006 | Maier | 210/787 |
| 2007/0012002 A1* | 1/2007 | Oh et al. | 55/428 |

FOREIGN PATENT DOCUMENTS

| | | |
|---|---|---|
| CA | 1 327 949 | 3/1994 |
| CA | 2 345 770 | 4/2000 |

OTHER PUBLICATIONS

Winkler, Jill, et al., "Cyclone Separators," [online], [retrieved on Jan. 26, 2007]. Retrieved from the Internet: www.wsu.edu:8080/~gmhyde/433_web_pages/cyclones/CycloneRptTeam4.html, 6 pages.

Tan, Z. C., et al., "Decay of Rotational Airflow with Flow Conditioner in Larger Diameter Ducts for Dust Concentration Measurement using Isokinetic Sampling." Agricultural Engineering International: the CIGR Journal of Scientific Research and Development. Manuscript BC 03 007. vol. V. Dec. 2003. 18 pages.

"Air Pollution Control Technology Fact Sheet," United States Environmental Protection Agency, EPA-CICA Fact Sheet: Cyclones [online]. Retrieved from the Internet: http://epa.gov/ttn/catc/dir1/fcyclon.pdf. 5 pages.

"Air Pollution Technology Fact Sheet," EPA Center on Air Pollution, EPA-CICA Fact Sheet: Cyclones [online]. Retrieved from the Internet: http://www.p2pays.org/ref/10/09866.pdf. 5 pages.

"Use of cyclones for removing dust from gas streams," EPA Guidelines, EPA 602/05, Issued Dec. 2005, Government of South Australia. [Online] Retrieved from the internet: http://www.epa.sa.gov.au/pdfs/guide_cyclones.pdf. 5 pages.

"About Industrial Dust Collectors, Baghouses, Baghouse Services, and Dust Collecting Systems." Industrial Quick Search, IQS Directory, Dust Collectors [online]. [Retrieved on Jan. 26, 2007.] Retrieved from the Internet: http://www.iqsdirectory.com/dust-collector/. 6 pages.

Jain, A, et al., "Studies on Gas-Solid Heat Transfer in Cyclone Heat Exchanger," (Abstract), Journal of Heat Transfer, vol. 128, Issue 8, Aug. 2006, 1 page.

Tan, Zhongchao, "Mechanisms of Particle Separation in an Aerodynamic Air Cleaner," [online]. [Retrieved on Jan. 31, 2007.] Word document available from Internet: www.asabe.org/awards/competitions/2004_Graduate_Winners/Z_Tan_Mechanisms.doc. 10 pages.

Chmielniak, Tomasz, et al., "Method of calculation of new cyclone-type separator with swirling baffle and bottom take off of clean gas—part II: experimental verification," Chemical Engineering and Processing 40 (2001) 245-254, 13 pages.

Zhang, Y., et al., "Particle Separation Efficiency of a Uniflow Deduster with Different Types of Dusts," retrieved from the Internet at http://age-web.age.uiuc.edu/bee/RESEARCH/Deduster/dedpaper2.html & http://age-web.age.uiuc.edu/bee/publication/publication.htm, 1999, 14 pages.

"Particulate Controls Technologies," Institute of Clean Air Companies [online]. [Retrieved on Jan. 26, 2007.] Retrieved from the Internet: http://www.icac.com/i4a/pages/index.cfm?pageid=3398. 5 pages.

"Exposure to Fine Air Pollution Linked With Risk of Respiratory and Cardiovascular Diseases," Science Daily, Mar. 8, 2008 [online]. Retrieved from the Internet: http://www.sciencedaily.com/releases/2006/03/060308084559.htm. 4 pages.

Tan, Zhongchao, "An analytical model for the fractional efficiency of a uniflow cyclone with a tangential inlet," Powder Technology, vol. 183, Issue 2, pp. 147-151, available online Jun. 29, 2007, 5 pages.

Tan, Z. et al., "Comparison of Two Models for Particle Separation in a Vane-Induced Uniflow Cyclone," ASHRAE, Technical and Symposium Papers presented at the 2005 winter meeting in Orlando, Florida of the American Society of Heating, Refrigerating and Air-Conditioning Engineers, 2005, 8 pages.

Zhang, Y., "Analysis and Validation of Particle Separation Efficiency in a Centrifugal Field under Laminar and Perfect Mixing Conditions," ASHRAE Transactions, vol. 109, issue 2, pp. 815-821, 2003, 7 pages.

* cited by examiner

CYCLONE

TECHNICAL FIELD

This invention relates to particle separation from a gas stream.

BACKGROUND

A cyclone is a widely used industrial gas-cleaning apparatus. Traditional cyclones use principles of centrifugal force to separate gas-borne particles from a gas stream (e.g., an air stream). Typically these cyclones use high air velocities and are associated with high turbulence intensity and particle re-entrainment, which can lead to low particle separation efficiency. For many years, the mainstream of cyclone technology was dominated by the reserve flow cyclone, with less research devoted to uniflow cyclones. In a uniflow cyclone, the gas and particles exit in the same direction. In a reverse flow cyclone, the gas reverses direction while in the cyclone and exits from the same direction that the inlet gas entered. Particles separated from the gas exit in the opposite direction.

SUMMARY

This invention relates to particle separation from a gas stream. In general, in one aspect, the invention features a cyclone including a housing, an inlet, a deflection member, an outlet tube and a bunker. The housing is a cylindrical housing and has an inner diameter D. The inlet is near a first end of the housing. The deflection member is positioned within and substantially coaxial to the first end of the housing. The outlet tube is positioned within and extends from a second end of the housing, and is substantially coaxial to the second end of the housing. The bunker is an annular bunker formed between the outlet tube and an inner wall of the housing and is configured to collect particles separated from an inlet gas stream. A gap between the deflection member and the outlet tube has a length in the range of approximately $0.4*D$ to $0.8*D$. The length of the bunker is approximately greater than or equal to $1.5*D$.

Implementations of the invention can include one or more of the following features. The inlet can be tangential to the first end of the housing. The cyclone can be formed with or without vanes near the first end of the housing. The inlet can be configured to receive a gas including sulphur droplets and the cyclone can further include a steam jacket positioned about an exterior of the housing and configured to maintain a temperature within the cyclone such that the sulphur droplets are maintained in a liquid state. The length of the deflection member can be in the range of approximately $0.15*D$ to $1.0*D$. At least one of either the deflection member or the outlet tube can be movable within the housing such that the length of the gap is adjustable. The outlet tube can be movable within the housing such that the length of the bunker is adjustable.

In general, in another aspect, the invention features a sulphur granulation system. The sulphur granulation system includes a sulphur granulation processor coupled to a cyclone, wherein flue gas exhausted from the processor is received at an inlet of the cyclone. The cyclone includes a cylindrical housing having an inner diameter D and an inlet near a first end of the housing. A deflection member is positioned within and substantially coaxial to the first end of the housing. An outlet tube is positioned within and extends from a second end of the housing. The outlet tube is substantially coaxial to the second end of the housing. An annular bunker is formed between the outlet tube and an inner wall of the housing and is configured to collect particles separated from an inlet gas stream. A gap between the deflection member and the outlet tube has a length in the range of approximately $0.4*D$ to $0.8*D$ and the length of the bunker is approximately greater than or equal to $1.5*D$. The system further includes a fan positioned downstream of and in fluid communication with the outlet tube such that the flue gas is drawn through the cyclone.

Implementations of the invention can include one or more of the following features. The outlet gas exiting from the outlet tube can include less than 50 milligrams of emissions per kilogram of wet air. The system can further include a steam jacket positioned about an exterior of the housing and configured to maintain a temperature within the cyclone such that sulphur droplets separated from the flue gas are maintained in a liquid state. The system can include a stack downstream of and in fluid communication with the outlet tube, wherein outlet gas exiting the outlet tube is vented to atmosphere through the stack. The bunker included in the cyclone can include a bunker outlet tube, where liquid sulphur collected in the bunker is transported from the cyclone through the bunker outlet tube for recycling back into the sulphur granulation processor.

In general, in another aspect, the invention features a cyclone including a cylindrical housing having an inner diameter D and an inlet near a first end of the housing. A deflection member is positioned within and coaxial to a second end of the housing. An outlet tube is positioned within and extends from the first end of the housing and is substantially coaxial to the housing. An annular bunker is formed between the deflection member and an inner wall of the housing and is configured to collect particles separated from an inlet gas stream. A gap between the deflection member and the outlet tube has a length in the range of approximately $0.4*D$ to $0.8*D$ and a length of the bunker is approximately greater than or equal to $1.5*D$.

Implementations of the invention can include one or more of the following features. The inlet can be a tangential inlet to the first end of the housing. The cyclone may or may not include one or more vanes near the first end of the housing. The inlet can be configured to receive a gas including sulphur droplets. In this implementation, the cyclone can further include a steam jacket positioned about an exterior of the housing and configured to maintain a temperature within the cyclone such that the sulphur droplets are maintained in a liquid state. The length of the deflection member can be in the range of approximately $0.15*D$ to $1.0*D$. At least one of either the deflection member or the outlet tube can be movable within the housing such that the length of the gap is adjustable.

Implementations of the invention can realize one or more of the following advantages. The cyclone can provide improved separation efficiency. The cyclone can be manufactured relatively quickly and inexpensively. For particular implementations, the cyclone can be heated or cooled, to maintain a temperature of an inlet gas stream and/or to facilitate recovery of particles separated therefrom. The cyclone can be fabricated with a smaller footprint than a conventional cyclone, which achieving improved efficiencies. The cyclone can be constructed as either a uniflow or a reverse flow cyclone.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

A cyclone configured to remove particles or droplets from an inlet gas stream is described. The cyclone includes a cylindrical housing and an inlet near a first end of the housing. A deflection member is positioned within and coaxial to the first end of the housing. An outlet tube is positioned within and extends from a second end of the housing. The outlet tube is coaxial to the second end of the housing. An annular bunker is formed between the outlet tube and an inner wall of the housing. The bunker is configured to collect and store particles separated from an inlet gas stream. A gap between the deflection member and the outlet tube has a length in the range of approximately $0.4*D$ to $0.8*D$, where D is the inner diameter of the housing. The length of the bunker is greater than or equal to $1.5*D$. Preferably, in some implementations, the length of the bunker is at least $2*D$. The term inlet gas is used broadly to include a particle-laden gas stream, where the particles may be solid and/or liquid (i.e., droplets).

The cyclone can incorporate a uni-directional flow design that uses cyclonic or vortex separation to remove particles from the inlet gas stream. Rotational effects are used to separate the solid and/or liquid particles from the gas. The substantially particle free gas can exit the cyclone through the outlet, while the contaminant particles can be contained within the bunker. A second outlet can be included in the bunker to remove from the bunker any solid particles or liquid droplets separated from the gas stream.

The range of gap between the deflection member and the outlet tube was determined through laboratory experimentation. The range where the length of the gap is approximately $0.4*D$ to $0.8*D$ provided the best performance in particle separation.

The length of the bunker should be long enough to create a "dead zone", that is, a zone with minimized air flow turbulence. The dead zone allows the particles collected in the bunker to be stored with minimum disturbance and therefore minimum re-entrainment. A shorter bunker, that is, a bunker not long enough to create a dead zone, will provide lower particle separation efficiency because some particles will reenter the gas stream (i.e., re-entrainment will occur). Providing a bunker having a length of at least $1.5*D$ can create a dead zone and improves particle separation efficiency.

In some implementations, the length of the deflection member can be in the range of approximately $0.15*D$ to $1.0*D$. At least one of either the deflection member or the outlet tube can be movable within the housing such that the length of the gap is adjustable. The outlet tube can be movable within the housing such that the length of the bunker is adjustable.

Figure 1:
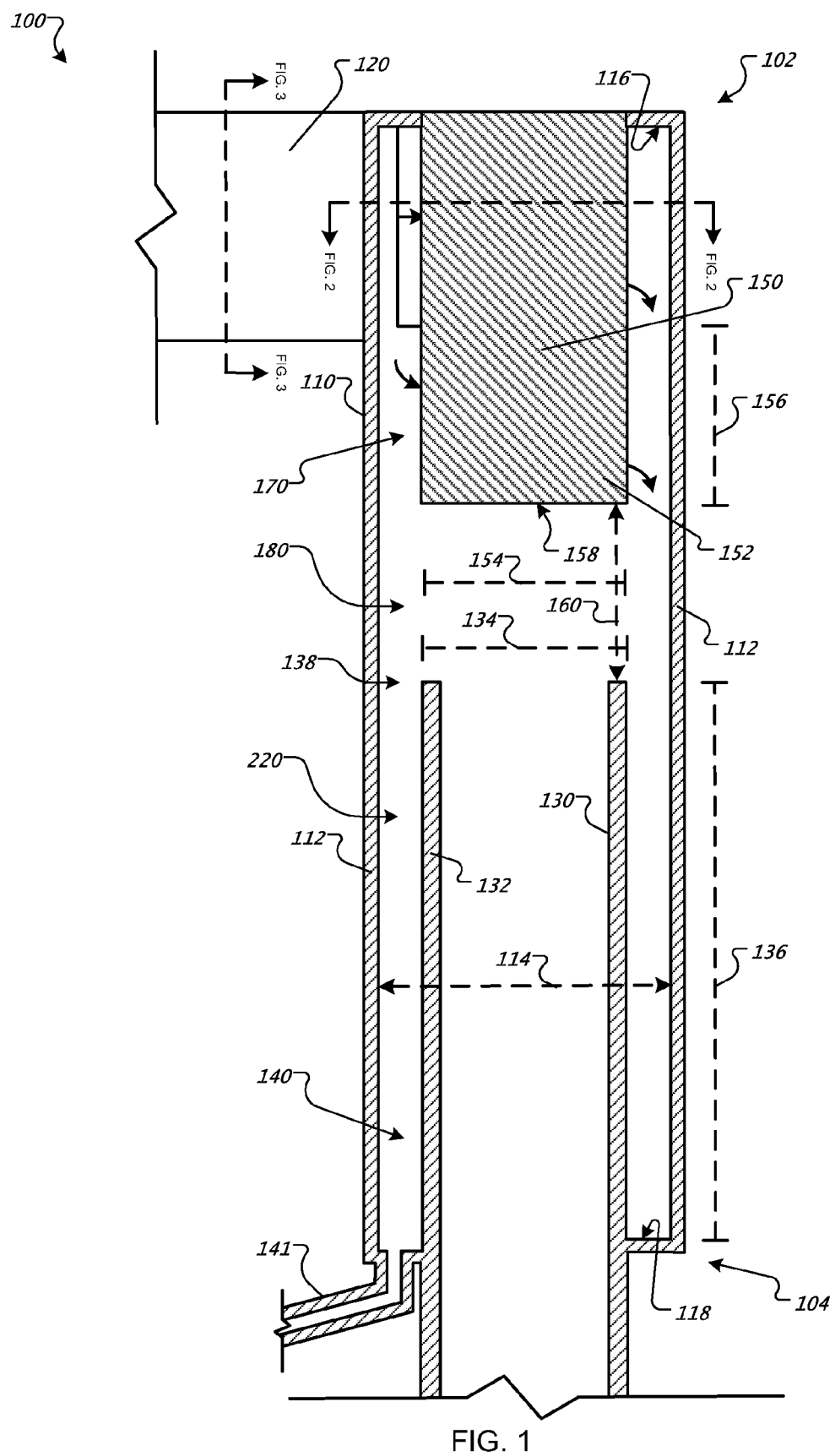
FIG. 1 is a cross-sectional view of a uniflow cyclone.
Figure 2:
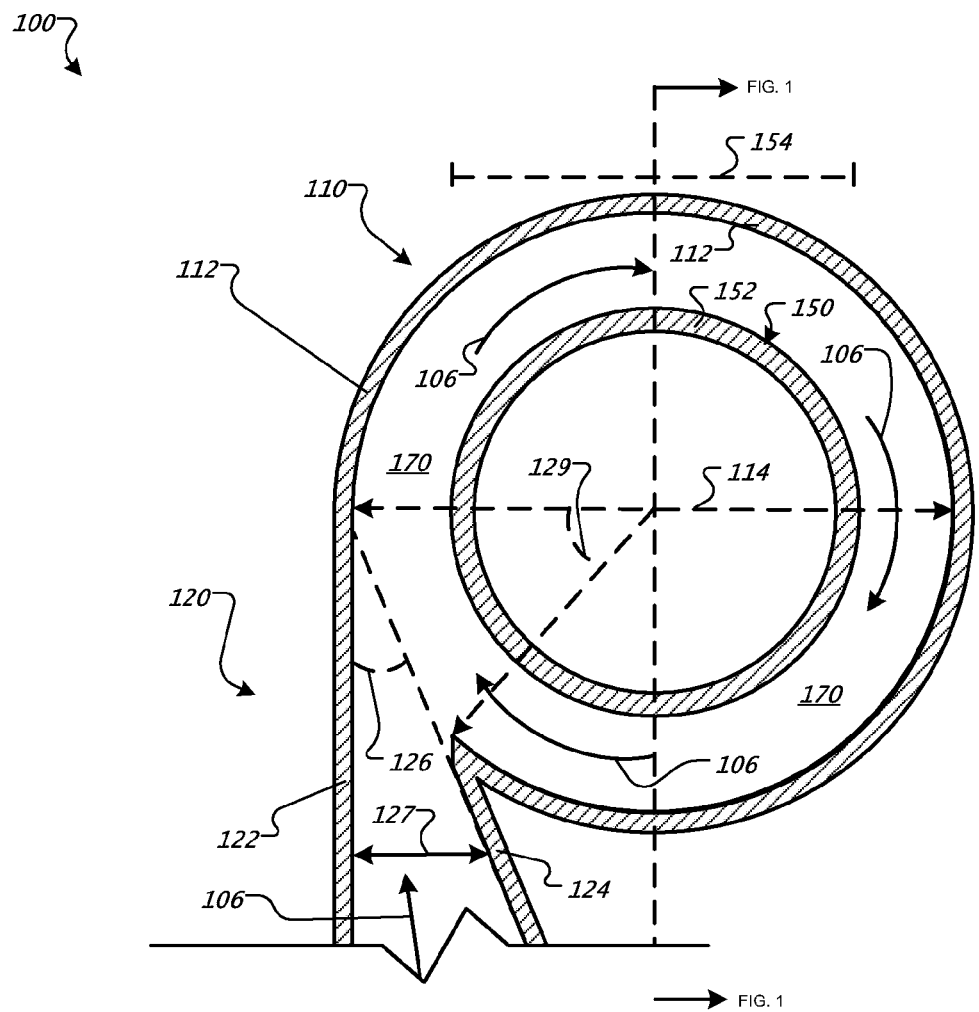
FIG. 2 is a cross-sectional view of a proximal end of the uniflow cyclone of FIG. 1.
Figure 3:
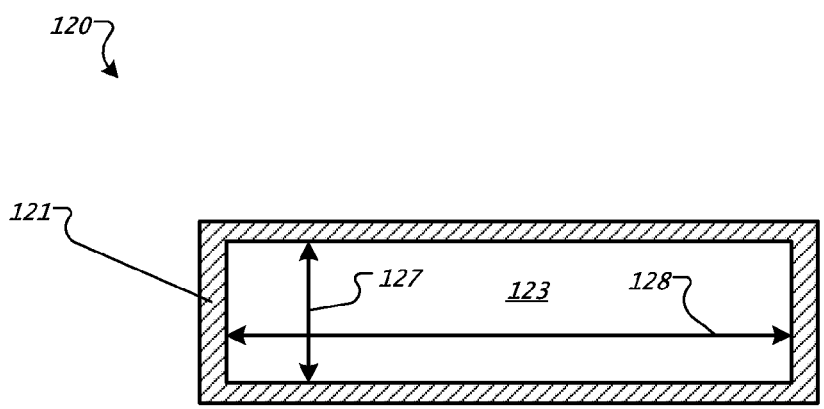
FIG. 3 is a cross-sectional view of an inlet tube of the uniflow cyclone of FIG. 1.

Referring to FIGS. 1-3, an example cyclone 100 is shown. The cyclone 100 includes a cylindrical housing 110 within which solid and/or liquid particulates are separated from an inlet gas stream. A proximal portion 102 of the cyclone 100 includes an inlet 120, the interior of which is fluidly connected to the interior of the housing 110 and through which a mixture of gasses, liquids, and/or solids pass into the housing 110. In the implementation shown, the inlet 120 has walls 121 (see FIG. 3) that define a rectangular cross section 123 (see FIG. 3) with a depth 127 and a width 128. FIG. 2 shows a cross-sectional view of the proximal portion 102 of the cyclone. As is shown in FIG. 2, the inlet 120 can be oriented tangentially to assist in the creation of a vortex within the housing 110. The cyclone 100 includes an outlet tube 130 in the distal portion 104, which can have a circular cross section and be coaxial to the housing 110. The interior of the outlet tube 130 is fluidly connected to the interior of the housing 110 and allows gas, which is substantially free from particulate contamination, to exit the housing 110.

The distal portion 104 of the cyclone 100 includes annular bunker. The bunker 140 is formed between the outlet tube and the inner wall of the housing and is fluidly connected to the interior of the housing 110. As particulates are separated from the gas stream in the housing 110, they can accumulate in the bunker 140, while the substantially contaminate-free gas exits through the outlet tube 130. In some implementations of the cyclone 100, the bunker 140 can be fluidly connected to additional equipment which can further process the particulates (e.g., collecting and preparing the particulates for reuse). In the implementation shown, a bunker outlet 141 is provided to remove particles and/or liquid collected in the bunker 140.

In some implementations the cyclone 100 can include an adapter connected to the inlet 120 to connect the inlet 120 to a source of contaminated gas, for example, where the source includes piping with dimensions that differ from the dimensions of the inlet 120. The cyclone 100 can include outlet piping and an exhaust fan connected to the outlet tube 130 for carrying the substantially contaminate-free gas out of the housing 110, through the outlet tube 130 and piping. In other implementations, the cyclone 100 is connected to existing equipment that includes outlet piping and/or an exhaust fan, possibly eliminating the need for the piping and/or the fan as part of a cyclone system.

Referring again to FIG. 2, the cyclone 100 has an inner wall 112 defining an inner diameter (D) 114. The cyclone 100 includes a deflection member located inside the proximal portion 102 of the housing 110, adjacent to a proximal face 116 and coaxial to the housing 110. In the example cyclone shown, the deflection member 150 and has an outer diameter 154 and a length 156, beyond the inlet 120. In other implementations, the deflection member 150 can be hollow rather than solid.

The outlet tube 130 has an outer wall 132 defining an outer diameter 134 and protrudes into the distal portion 104 of the housing 110 with a length 136. The annular bunker 140 also has length 136. As discussed above, the length 136 of the bunker is greater than or equal to $1.5*D$, where D is the inner diameter 114 of the housing. The distance between the distal end of the deflection member 150 and the proximal end of the outlet tube 130 defines a flow gap 160. As discussed above, the gap is approximately 0.4*D to 0.8 D in length.

The portions of the deflection member 150 and outlet tube 130 located inside the housing 110 can help to define three functional regions within the housing 110. The housing 110 can include a cyclonic region 170, the volume between the outer wall 152 of the deflection member 150 and an inner wall 112 of the housing 110 and extending from the proximal face 116 of the housing 110 to the end of the deflection member 150 (e.g., a plane defined by a distal face 158 of the deflection member 150). The housing 110 can include a separation region 180, the cylindrical region inside the housing 110 bounded by the inner wall 112 and located between the deflection member 150 and the outlet tube 130. The housing 110 can include a bunker region 190, the volume between the outer wall 132 of the outlet tube 130 and the inner wall 112 of the housing 110 and extending from a proximal end 138 of the outlet tube 130 to a distal face 118 of the housing 110.

In the implementation shown, the inlet 120 is connected to the housing 110 in such a way that the incoming gas stream enters the cyclonic region 170 of the housing 110 tangentially and flows around the deflection member 150, between the deflection member 150 and the inner wall 112 of the housing 110. The stream flows in an exemplary direction indicated by arrows 106, thus creating a cyclone that helps to separate solid and/or liquid particles from the gas stream. As the stream flows along the inner wall 112, the stream also moves toward the outlet tube 130 in the proximal portion 104 of the housing 110. In some implementations, a proximal inner wall 122 of the inlet 120 is not parallel to a distal inner wall 124 of the inlet 120, yielding an attack angle 126 between the two walls 122 and 124, as shown in FIG. 2. The angle 126 can cause the cross-section of the inlet 120 to narrow at the portion closest to the housing 110, thus increasing the velocity of the gas stream as it enters the housing 110. The angle 126 can also help direct the gas stream toward the inner wall 112 of the housing 10, and/or decrease turbulence in the stream as it enters the housing 110. In other implementations, there is no attack angle, and the walls 122 and 124 of the inlet are substantially parallel to one another.

As the stream rotates within the housing 110 and moves in the direction of the proximal portion 104, the stream moves beyond the deflection member 150 and enters the separation region 180 (e.g., as defined by the gap 160 between the deflection member 150 and the outlet tube 130). In the separation region 180 the less dense components of the stream (e.g., gases) move toward the center of the housing 110, while the denser components (e.g., liquids and/or solids) continue to rotate along the inner wall 112. The stream continues to move toward the proximal portion 104, where the substantially contaminate-free gas exits through the outlet tube 130 and the contaminants enter the bunker region 190, subsequently falling into and accumulating in the bunker 140.

The cyclone 100 can be manufactured from materials such as stainless steel, acrylic, PVC, and/or any suitable materials. In some implementations, components of the cyclone 100 (e.g., the housing 110, the inlet 120, the outlet tube 130, and the like) are manufactured from galvanized sheet metal, in a similar way to ductwork for HVAC systems. The sheet metal can be rolled and interconnected to form cylindrical components (e.g., the housing 110, the outlet tube 130, and the like) and/or can be stamped and assembled to form rectangular components, such as the inlet 120. Due in part to the high availability and relative low cost of galvanized sheet metal, the cyclone 100 can advantageously be constructed less expensively than designs that include components requiring more complicated manufacturing and expensive materials.

Implementations of the cyclone 100 have been shown to reach mass collection efficiencies of approximately 97%. However, the efficiency can vary depending on the properties of the particles being separated from the inlet gas stream. For example, experiments were conducted for an implementation of the cyclone 100 where particles were monodisperse dust that was ISO 12103-1, A3 Medium test dust produced by Powder Technology, Inc. of Burnsville, Minn. The dust size distribution was between 0.825 µm up to 87.57 µm with the mean diameter being approximately 12.11 µm. The majority of the dust (i.e., approximately 80%) was Silica ($SiO_2$). The specific gravity of the dust was approximately 2.65. In these experiments the efficiency was as high as approximately 97%, however, the efficiency can be higher or lower depending on the particles.

The cyclone 100 can be used commercially to separate solid and/or liquid particles from a stream of gas. In some implementations, the cyclone 100 can be used as a pre-filter prior to other forms of filtration such as mechanical filters (e.g., fabric filters, and bag filters), chemical filters (e.g., activated carbon), biological filters, and/or wet scrubbers. In these examples, the cyclone 100 can be used to increase the life of a downstream filter, some of which can be more expensive to operate than the cyclone, by removing contaminants before reaching the downstream filter. In these examples, the inclusion of a cyclone pre-filter can lower the operating cost of an overall filtration system. Exemplary filter types that can precede and/or follow the cyclone air filter include ultraviolet purifiers and/or ozone generators (e.g., to kill bacteria and/or viruses). In other examples, the cyclone air filter can be used as the only form of filtration.

Exemplary uses for the cyclone include use in power plants to reduce flue gas emissions, in chemical plants, in manufacturing plants, and in material forming plants. As some implementations of the cyclone do not use physical media or solvents to capture the contaminants, the resulting captured particles can be efficiently disposed of or recycled.

Sulphur Recovery Example

In some implementations, the cyclone 100 is an efficient, cost-effective way of removing sulphur contamination from the emissions of a sulphur granulation process. The cyclone 100 can be capable of 98% and higher total mass efficiencies depending on the size distributions of particles entering into the cyclone, similar to other techniques such as wet-scrubbing, but at lower cost. In some examples, the cyclone 100 can achieve longevities greater than that of wet-scrubbers, while representing one-third to one-half the capital cost and one-tenth the operating costs.

Figure 4:
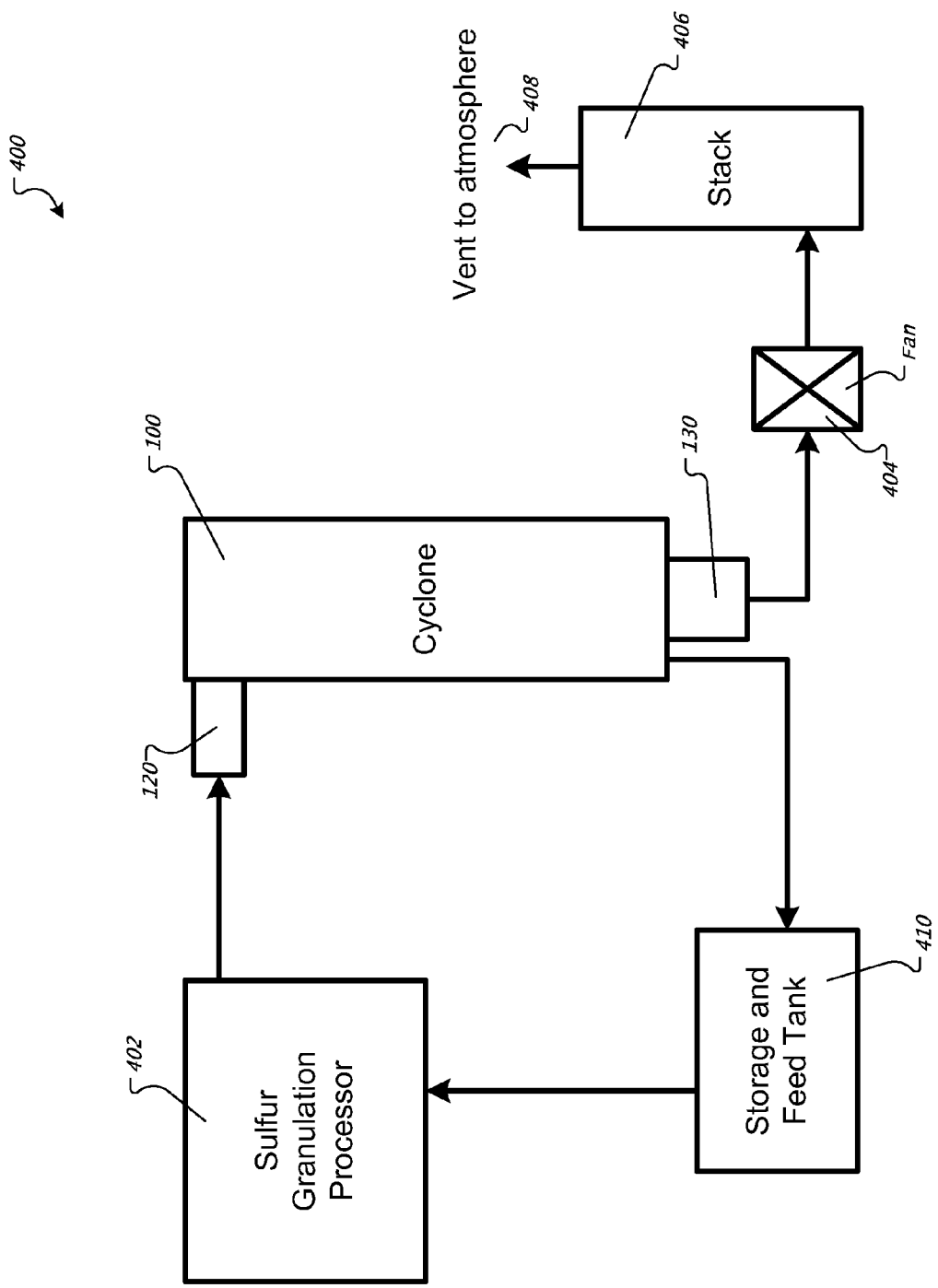
FIG. 4 is a schematic block diagram of a sulphur granulation process example implementation.

Referring to FIG. 4, a schematic representation of a system 400 for sulphur granulation including a cyclone 100 is shown. The system 400 is simplified for illustrative purposes and can include more or fewer elements than those shown. In this example system 400, the cyclone 100 can be used to remove contaminates included in the emissions from a sulphur granulation process. The sulfur granulation processor 402 (which is shown simply as box 402, but can be one or more pieces of equipment) can produce emissions that include higher concentrations of certain particulates than is allowed by regulation. In some examples, total particulates in exhaust (e.g., in exhaust that is vented to atmosphere) are regulated to be below 50 mg/kg.

An exhaust from the sulphur granulation processor 402 can be coupled to the inlet 120 of the cyclone 100. An exhaust fan 404 downstream of the cyclone 100 can create a pressure drop across the cyclone 100 and draw flue gas emitted from the sulphur granulation processor 402 into the cyclone 100. The outlet tube 130 is connected to outlet piping which can be coupled to the fan 404 and/or a stack 406 from which the cleaned exhaust gas is emitted. In some implementations, the cyclone 100 can reduce particulate contamination of the gas stream leaving through the outlet tube 130 to lower than 50 mg/kg. In the example shown, the gas vents to atmosphere 408, although in other examples, the exhaust gas may be captured and recycled or otherwise further processor, for example, through one or more additional filters.

In some implementations, for example, due to previous processing and the temperature of the flue gas, sulphur contained within the flue gas entering the inlet 120 can be in liquid form, solid form, or both. When droplets of liquid sulphur, such as those found in the flue gas, contact a surface (e.g., the inner wall 112 of the housing 110) that is below the melting point of sulphur (about 115 degrees Celsius), the droplets can solidify and adhere to the surface causing an undesirable build-up. While the cyclone 100 is capable of simultaneously separating both solids and liquids from an air stream, it can be advantageous to maintain the sulphur in its liquid state while contained within the cyclone 100. To help accomplish this, surfaces in contact with the flue gas can be heated to a temperature that is above the melting point of sulphur (e.g., a temperature that is greater than about 115° C.). Since some implementations of the cyclone 110 can be exposed to corrosive contaminants, such as sulphur, and/or high temperatures, the cyclone 100 can be manufactured from materials resistant to heat and/or corrosion such as stainless steel (e.g., SS316, SS304, and the like).

In some implementations, one or more of the surfaces that come into contact with the flue gas, such as the inner wall 112 of the housing 110, the outer wall 132 of the outlet tube 130, the outer wall 152 of the deflection member 150, the inner walls of the bunker 140, and the like, can be heated. Examples of heating techniques can include covering the surface to be heated with electric elements, tubing through which steam is flowed, or plate-type jackets through which steam is flowed, although other techniques can be used.

Figure 5A:
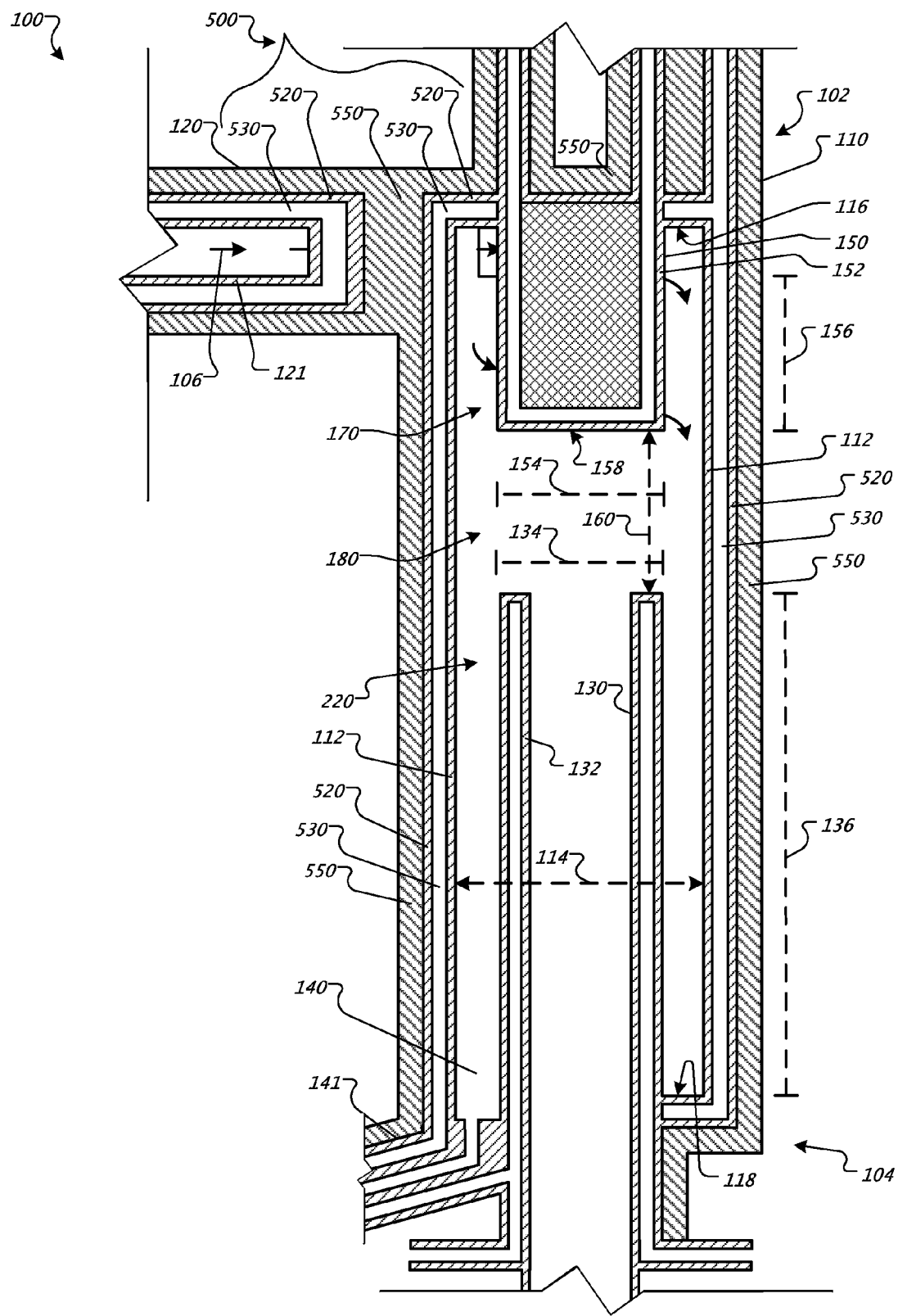
FIG. 5A is a cross-sectional view of another implementation of the uniflow cyclone including a steam jacket.
Figure 5B:
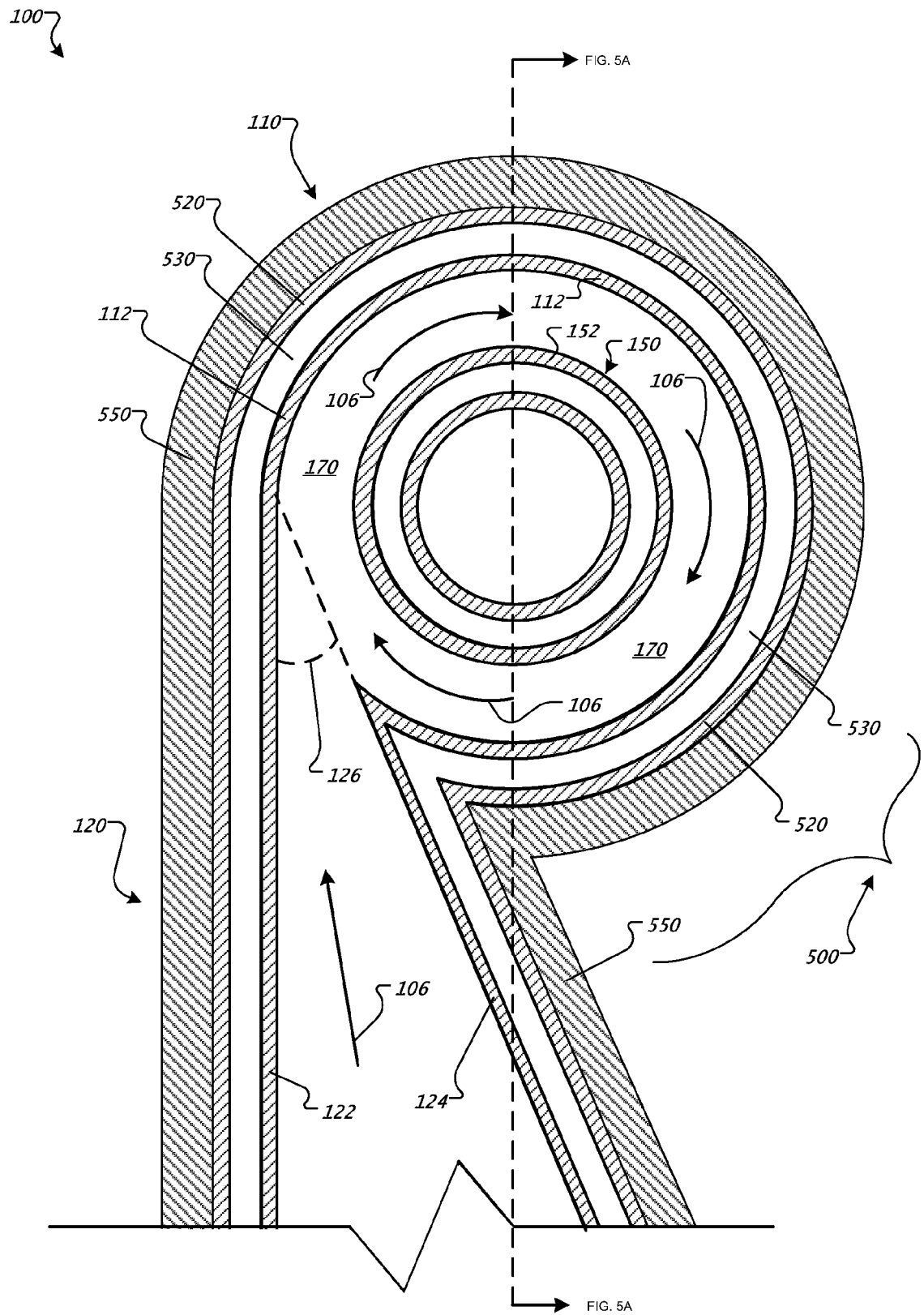
FIG. 5B is a cross-sectional view of a proximal end of the uniflow cyclone of FIG. 5A.

Referring now to FIGS. 5A and 5B, an example cyclone 100 that includes a plate-type jacketing system 500 to heat surfaces of the cyclone 100 is shown. The plate-type jacketing system 500 includes inner walls that are integral with the inner walls of the cyclone 100 (e.g., the inner wall 112, the outer wall 132, the inner wall 141, and the like) and transfers heat to these walls. The system 500 includes outer walls 520 and inner volumes 530 between the inner walls of the cyclone 100 and the outer walls 520. An insulation layer 550 can keep heat from radiating out of the system 500, thus directing the heat toward the desired targets (e.g., the inner walls of the cyclone 100). A heated substance, such as steam, can be flowed into inlets 560, through the inner volume 530, and exit from outlets 570 to heat the system 500 and surrounding surfaces (e.g., to a temperature above 115° C.).

The plate-type jacketing system 500 can be manufactured from steel (e.g., galvanized, stainless, and the like) and/or other materials that are resistant to corrosion, such as that caused by steam, and high heat. The jacketing system 500 can be purchased from a provider that customizes and manufactures plate-type systems, such as plate coils, electrical heat traced plates and others, to supplied specifications.

As the flue gas passes through the inlet 120 and enters the cyclonic region 170 of the housing 110, the gas rotates around the deflection member 150 and moves toward the distal portion 104 of the housing 110, thus forming the separation cyclone. Denser particles such as solids and liquids (e.g., liquid sulphur droplets) move closer to the inner wall 112, while particles of lesser density, such as gases, remain closer to the deflection member 150. When the stream moves into the separation region 180, the gases move toward the center of the housing 110 while the solids and liquids remain closer to the inner wall 112, all while continuing to rotate inside the housing 110 and moving toward the distal portion 104. The substantially contaminate free gas exits the housing 110 through the outlet tube 130 and is directed to the stack 406. The contaminant particles spiral along the inner wall 112 toward the distal portion 104 of the housing where they collect in the bunker 140.

In the implementations described here, the collected particles in the bunker 140 can be maintained at a temperature that is above that of the melting point of sulphur (e.g., the bunker can be maintained above approximately 115° C.). The bunker 140 can include the outlet 141 (e.g., in the bottom of the bunker 140) to allow contents of the bunker 140 to be removed. In the example system 400 shown, the outlet 141 is primarily to recover liquid sulphur separated from the flue gas. The sulphur is directed from the bunker 140 to a sulphur storage and feed tank 410, where the sulphur is recycled back into the sulphur granulation processor 402. However, in other implementations, the recovered sulphur can be disposed of or otherwise used for different purposes.

Horizontal Cyclone Example

Figure 6:
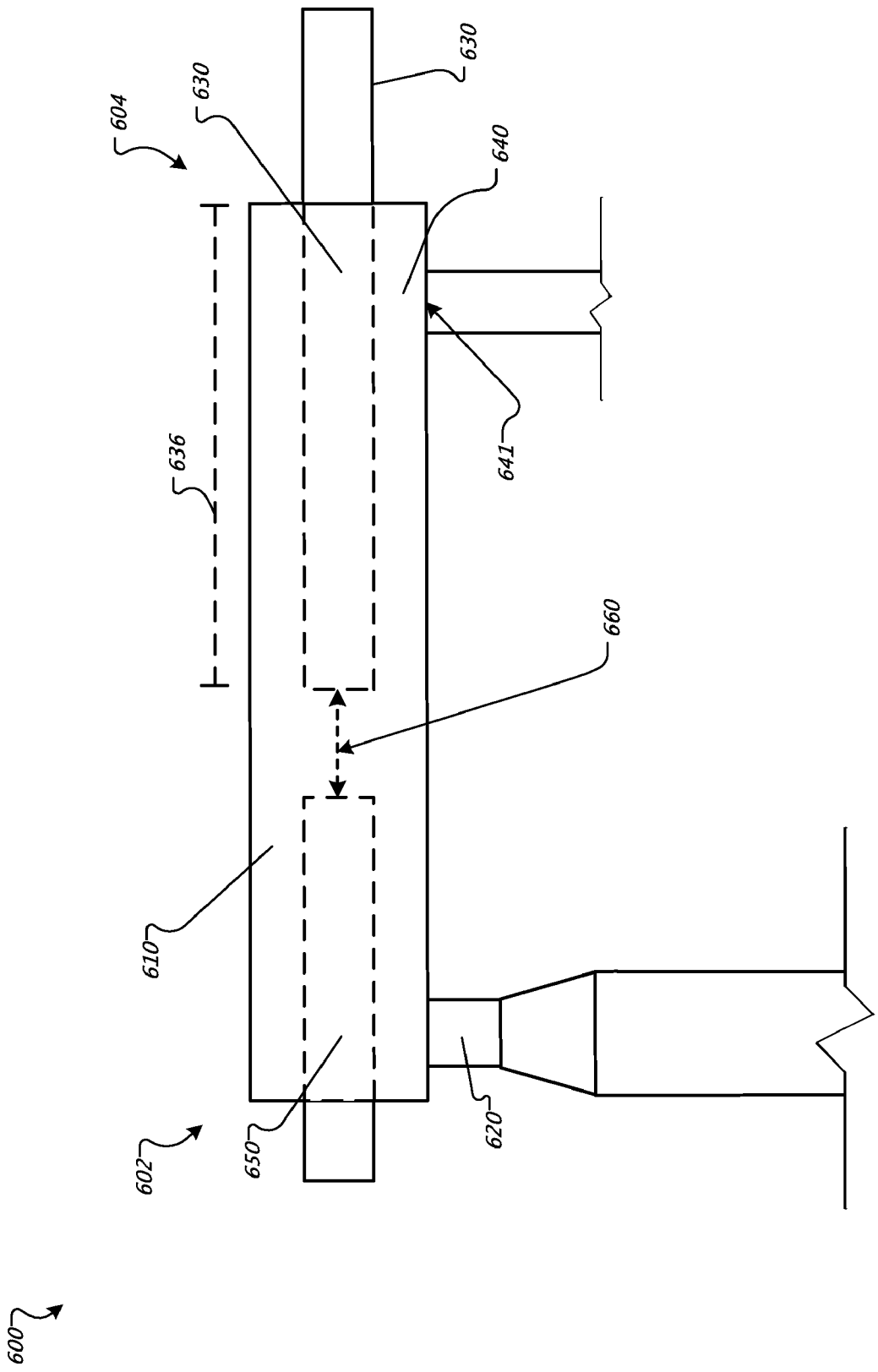
FIG. 6 is a side view of a horizontally orientated uniflow cyclone.

Referring to FIG. 6, in some implementations, the cyclone 600 can be positioned such that the axis of the housing 610 is oriented substantially horizontally rather than vertically as shown in FIG. 1. As with other implementations described, an inlet gas stream enters the housing 610 through the inlet 620, begins to swirl around the deflection member 650, and moves toward the distal portion 604. A combination of the gravity and the cyclonic action cause contaminate particles to fall into and accumulate in the bunker 640, while substantially contaminant free gas exits the outlet tube 630. In the horizontal implementation, the bunker outlet 641 can be orientated substantially vertically as shown, such that gravity assists in removed solid particles and/or liquid from the bunker 640.

As with vertical implementations described above, to improve efficiency, the gap 660 between the deflection member 650 and the outlet tube 630 has a length in the range of approximately 0.4 times the inner diameter 614 of the housing to 0.8 times the inner diameter 614. The length 636 of the bunker 640 is approximately equal to or greater than 1.5 times the inner diameter 614.

Vane-Including Example

Figure 7:
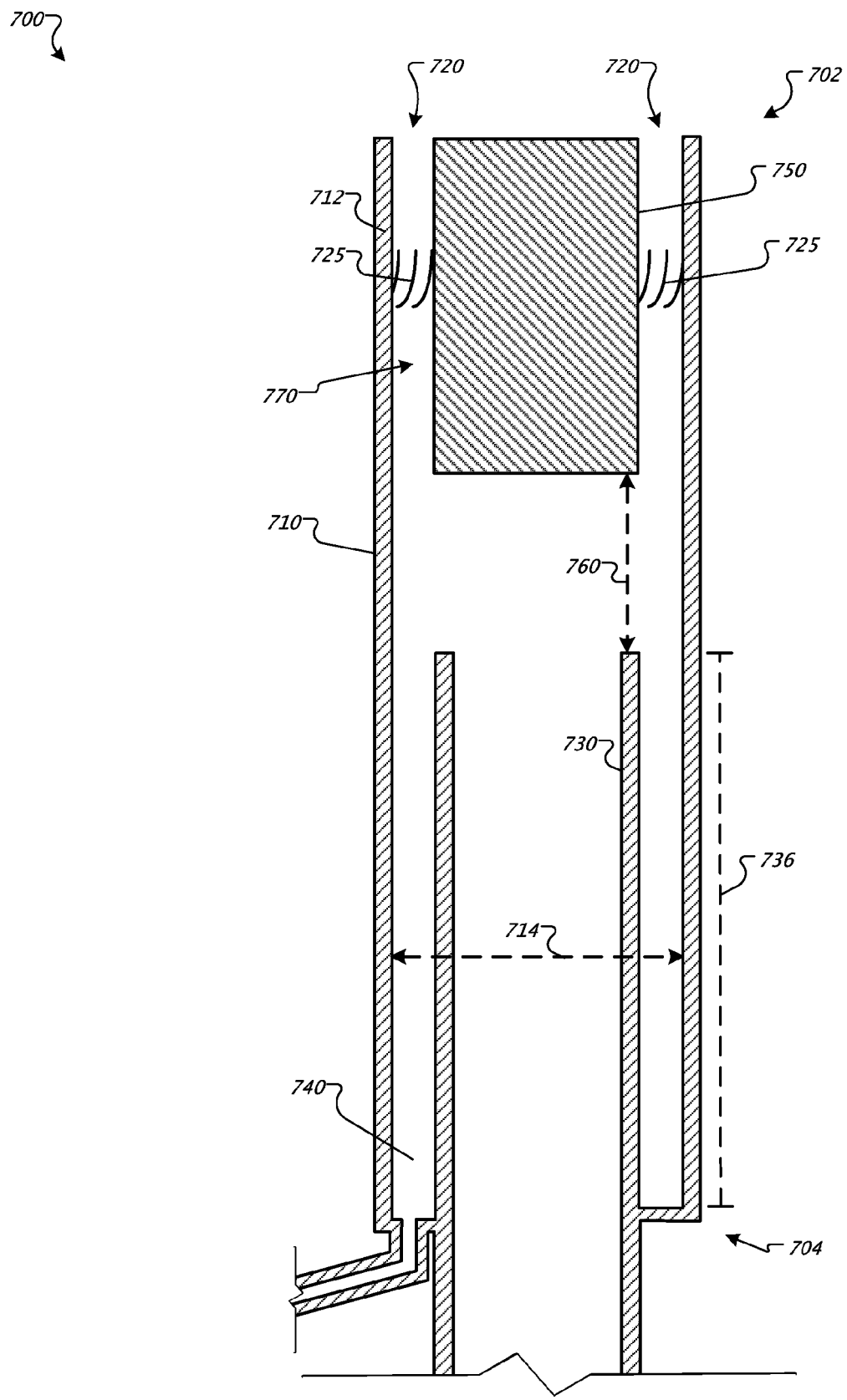
FIG. 7 is a cross-sectional view of another implementation of a uniflow cyclone including vanes.

Referring to FIG. 7, another implementation of an example cyclone 700 is shown. In some implementations, the cyclone 700 can include an inline version of the inlet 720 through which an inlet gas stream can pass into the housing 710. Included within the inlet 720 are vanes 725 that divert the incoming gas stream, encouraging the stream to rotate around the deflection member 750, thus creating the cyclone action. If vanes 725 are used rather than a tangential inlet, generally the efficiency will be lower, for example, in the range of approximately 80% as compared to 97%. However, as an advantage, the cyclone 700 can be operated with lower energy costs, as less power can be required to drive the gas stream through the cyclone 700 as compared to the tangential inlet cyclone 100.

As with previously described implementations, the gas stream rotates around the inner wall 712 within the housing 710 as the stream moves from the proximal portion 702 toward the distal portion 704. After entering the separation region 770, lighter gases move toward the center of the housing 710 and pass into the outlet tube 730, while the contaminants rotate along the inner wall 712 and collect in the bunker 740. As with some implementations described previously, to improve efficiency, the gap 760 between the deflection member 750 and the outlet tube 730 has a length in the range of approximately 0.4 times the inner diameter 714 to 0.8 times the inner diameter 714. The length 736 of the bunker 740 is approximately equal to or greater than 1.5 times the inner diameter 714.

Experimental Examples

The above discussion includes a description of some relative dimensions of the cyclone 100. That is, the gap is approximately 0.4 to 0.8 times the inner diameter of the housing, and the length of the bunker is approximately 1.5 or more times the inner diameter of the housing. In one particular implementation, the cyclone 100 has the following dimensions:
  inner diameter (D) 114=9.5 inches,
  inlet 120=width 128 of 7.25 inches and depth 127 of 1.25 inches;
  deflection member 150=diameter 154 of 7.0 inches and length 156 of 6.0 inches;
  outlet tube 130=outer diameter 154 of 7.0 inches and length 156 of 25 inches;
  gap=for experimental purposes, the length of the gap was adjustable, so that the optimal range of gap could be identified;
  bunker=for experimental purposes, the length of the bunker was adjustable, so that the optimal range of gap could be identified;
  overall length of housing=5.6 feet A first prototype cyclone 100 having the above dimensions was fabricated and experiments were conducted, wherein certain measurements were recorded. A fan positioned downstream of the outlet tube 130 and in fluid communication therewith was operated at a speed such that the velocity at the inlet 120 was approximately 0-20 meters per second with a flow rate of approximately 0-700 $m^3$/hour. A pressure drop of approximately 0-3.0 kPa (kilopascals) was recorded. Using test dust with a diameter size distribution of 0.825 micrometers to 87.57 micrometers and a mean diameter of 12.11 micrometers, implementations of the cyclone 110 have achieved a total mass efficiency of 98%.

A second prototype cyclone was fabricated having dimensions three times the first prototype cyclone described above, and was field tested in a sulphur recovery implementation. The second prototype cyclone was considered a full scale prototype for this particular type of implementation. In the full scale prototype, the dimensions were as follows:
  inner diameter (D) 114=14 inches;
  inlet 120=width 128 of 3 inches and depth 127 of 17 inches;
  deflection member 150=diameter 154 of 14 inches and length 156 of 26 inches;
  outlet tube 130=outer diameter 154 of 20 inches and length 156 of 65 inches;
  gap=length of 10 inches;
  bunker=length of 22 inches;
  overall length of housing=65 inches.

The full scale prototype was fabricated out of stainless steel sheet metal. The cyclone housing was wrapped with steam tubing allowing steam heating at a steam pressure of 2 bar. The heating kept the sulphur collected in the bunker in a liquid state and helped to prevent separated sulphur particles from solidifying and plugging up the cyclone. In one experimental configuration, the inlet gas stream received at the inlet 120 was approximately 75° C. The cyclone was found to successfully reduce the emission to the level of 50 mg/kg air or less. The flow rate was approximately 9000 $m^3$/hr.

Reverse Flow Implementation

Figure 8A:
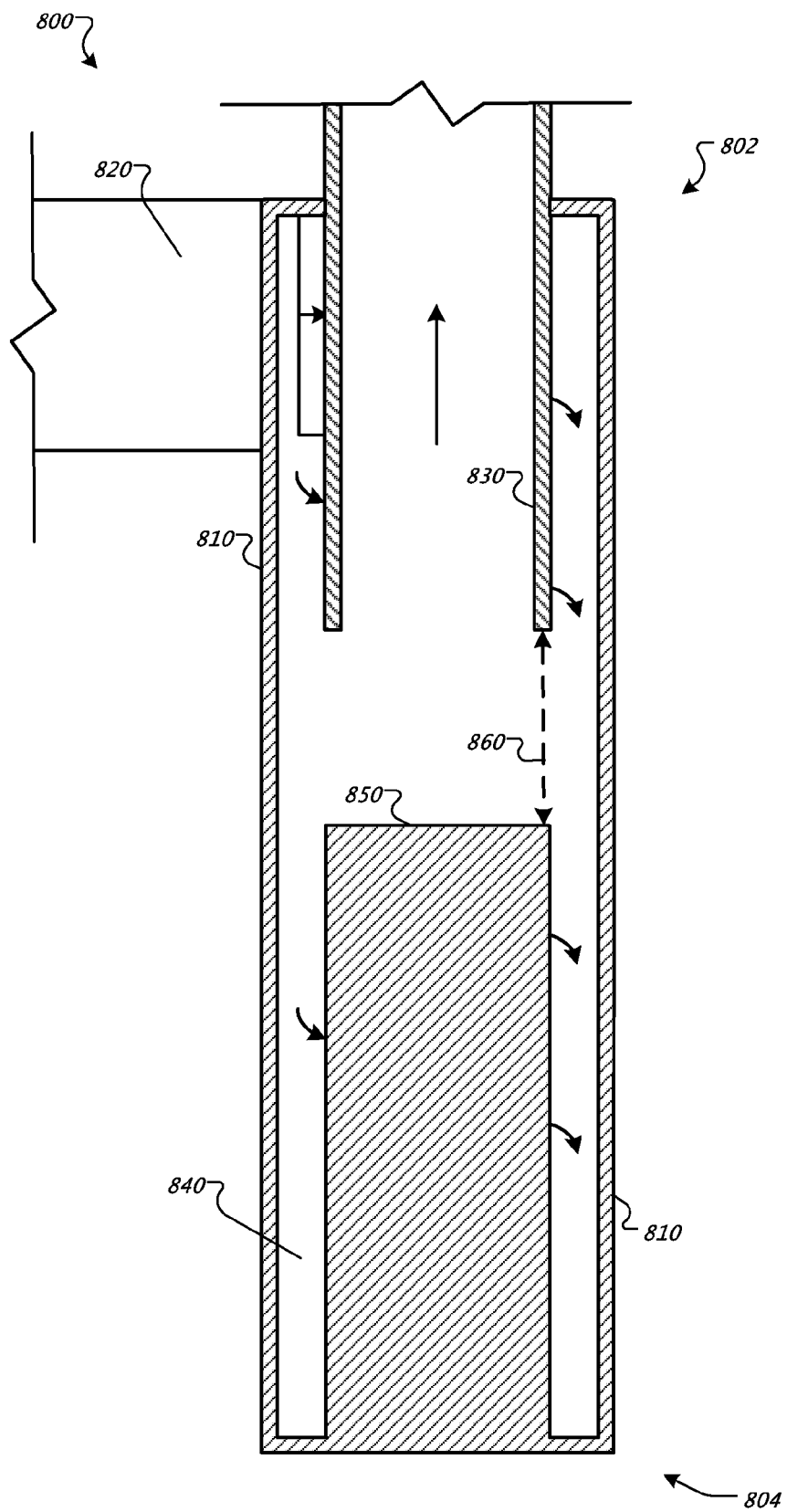
FIG. 8A is a cross-sectional view of a reverse flow cyclone with a tangential inlet.

Referring to FIG. 8A, in one implementation, the cyclone can be constructed as a reverse flow cyclone 800. The cyclone 800 includes a cylindrical housing 810. A proximal portion 802 of the cyclone 800 includes an inlet 820, the interior of which is fluidly connected to the interior of the housing 810 and through which a mixture of gasses, liquids, and/or solids pass into the housing 810. The inlet 820 can be oriented tangentially to assist in the creation of a vortex within the housing 810. The cyclone 800 includes an outlet tube 830 also in the proximal portion 802, which can have a circular cross section and be coaxial to the housing 810. The interior of the outlet tube 830 is fluidly connected to the interior of the housing 810 and allows gas which can be substantially free from particulate contamination to exit the housing 810.

The distal portion 804 of the cyclone 800 includes an annular bunker 840. The bunker 840 is formed between a deflection member 850 and the inner wall of the housing and is fluidly connected to the interior of the housing 810. As particulates are separated from the gas stream in the housing 810, they can accumulate in the bunker 840, while the substantially contaminate-free gas exits through the outlet tube 830. In some implementations of the cyclone 800, the bunker 840 can be fluidly connected to additional equipment which can further process the particulates (e.g., collecting and preparing the particulates for re-use).

The inlet gas stream enters the inlet 820 and swirls about the exterior surface of the outlet tube 830 and then about the deflection member 850, such that particles are collected and stored in the bunker 840. The distal end of the housing 810 is closed, and the gas stream therefore travels back in the same direction from which it entered the housing 810 and exits from the outlet tube 830. The gap 860 between the start of the outlet tube 830 and the closed end of the deflection member 850 is between approximately 0.4*D to 0.8*D in length, where D is the inner diameter of the housing 810. The length of the bunker 840 is at least 1.5*D. In the figure, the deflection member 850 is shown as a solid tube. However, it should be understood the deflection member 850 can be hollow or have a different configuration, so long as the end facing the outlet tube 830 is closed.

Figure 8B:
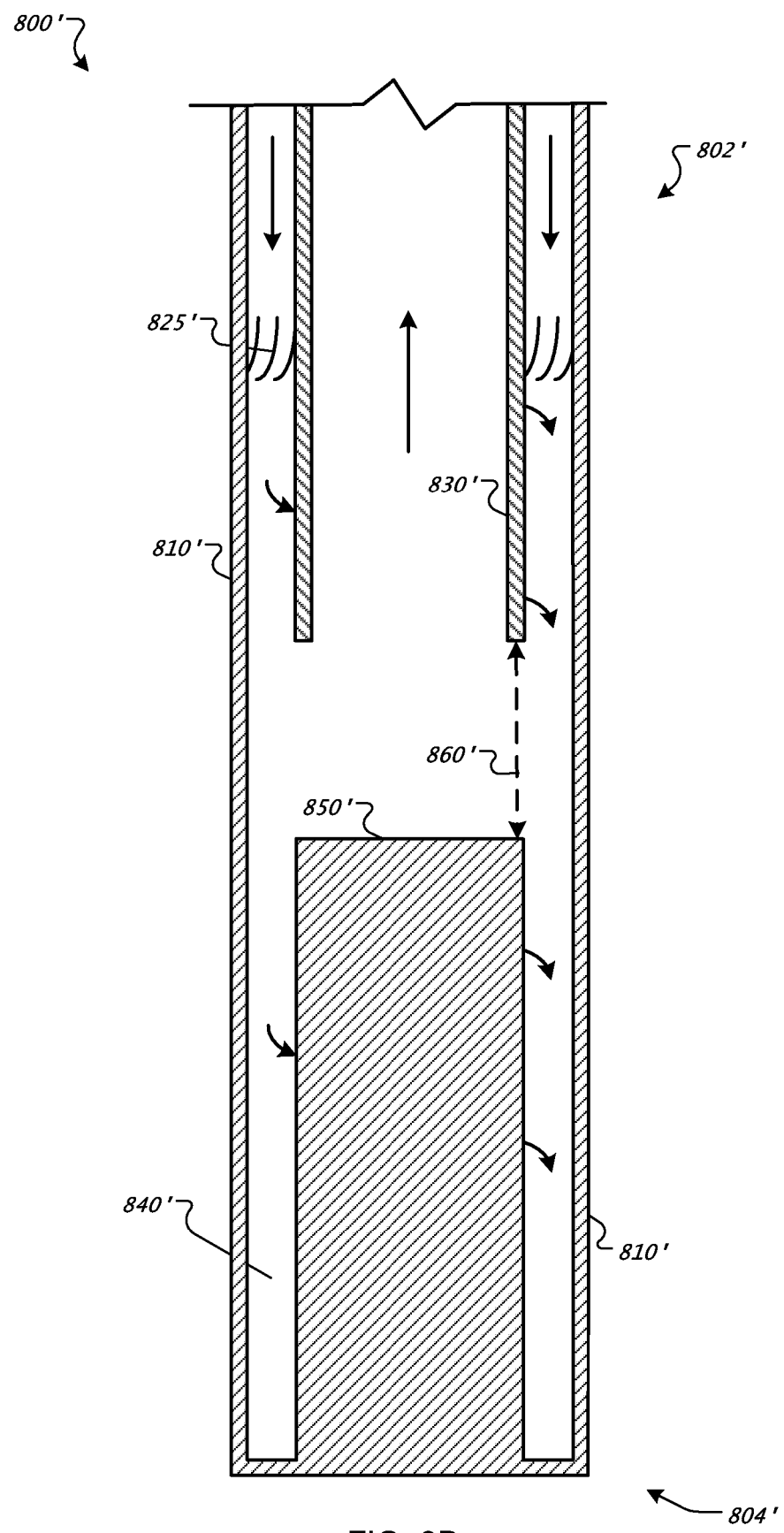
FIG. 8B is a cross-sectional view of a reverse flow cyclone with vanes at the inlet.

Referring to FIG. 8B, in one implementation, the cyclone can be constructed as a reverse flow cyclone 800' with vanes 825' included at the inlet. The size and positioning of the vanes 825' can be different in different implementations. However, in such an implementation, the vanes 825' are included in the path of the incoming gas stream.

Similar to the cyclone discussed above in reference to FIG. 8A, the cyclone 800' includes a cylindrical housing 810'. A proximal portion 802' of the cyclone 800' includes an inlet 820' through which a mixture of gasses, liquids, and/or solids pass into the housing 810'. The cyclone 800' includes an outlet tube 830' also in the proximal portion 802', which can have a circular cross section and be coaxial to the housing 810'. The interior of the outlet tube 830' is fluidly connected to the interior of the housing 810' and allows gas which can be substantially free from particulate contamination to exit the housing 810'.

The distal portion 804' of the cyclone 800' includes an annular bunker 840'. The bunker 840' is formed between a deflection member 850' and the inner wall of the housing and is fluidly connected to the interior of the housing 810'. As particulates are separated from the gas stream in the housing 810', they can accumulate in the bunker 840', while the substantially contaminate-free gas exits through the outlet tube 830'. In some implementations of the cyclone 800', the bunker 840' can be fluidly connected to additional equipment which can further process the particulates (e.g., collecting and preparing the particulates for re-use).

The inlet gas stream enters the inlet 820' and swirls about the exterior surface of the outlet tube 830' and then about the deflection member 850', such that particles are collected and stored in the bunker 840'. The distal end of the housing 810' is closed, and the gas stream therefore travels back in the same direction from which it entered the housing 810' and exits from the outlet tube 830'. The gap 860' between the start of the outlet tube 830' and the closed end of the deflection member 850' is between approximately 0.4*D to 0.8*D in length, where D is the inner diameter of the housing 810'. The length of the bunker 840' is at least 1.5*D. In the figure, the deflection member 850' is shown as a solid tube. However, it should be understood the deflection member 850' can be hollow or have a different configuration, so long as the end facing the outlet tube 830' is closed.

Other Implementations

In some implementations, the deflection member 150 and/or the outlet tube 130 can slide axially within the housing 110. This movement can be used to adjust the length of the deflection member 150 within the housing, the length of the outlet tube 130 within the housing and therefore the bunker length, and/or the gap 160. This adjustment can be used to tailor the characteristics of the cyclone 100 to specific applications (e.g., adjusting the gap 160 based on the size distribution of the contaminate particles).

A number of implementations of the invention have been described. Nevertheless, it will be understood that various modifications may be made without departing from the spirit and scope of the invention. Accordingly, other implementations are within the scope of the following claims.

What is claimed is:

1. A cyclone comprising:
   a cylindrical housing having an inner diameter D;
   an inlet near a first end of the housing;
   a deflection member positioned within and substantially coaxial to the first end of the housing; and
   an outlet tube positioned within and extending from a second end of the housing, the outlet tube substantially coaxial to the second end of the housing;
   an annular bunker formed between the outlet tube and an inner wall of the housing and configured to collect particles separated from an inlet gas stream;
   wherein a gap between the deflection member and the outlet tube has a length in the range of approximately 0.4*D to 0.8*D and wherein a length of the bunker is approximately greater than or equal to 1.5*D.

2. The cyclone of claim 1, wherein the inlet comprises a tangential inlet to the first end of the housing.

3. The cyclone of claim 2, wherein the cyclone does not include one or more vanes near the first end of the housing.

4. The cyclone of claim 1, wherein the cyclone further comprises:
   a plurality of vanes included in the first end of the housing.

5. The cyclone of claim 1, wherein the inlet is configured to receive a gas including sulphur droplets, the cyclone further comprising:
   a steam jacket positioned about an exterior of the housing and configured to maintain a temperature within the cyclone such that the sulphur droplets are maintained in a liquid state.

6. The cyclone of claim 1, wherein a length of the deflection member is in the range of approximately 0.15*D to 1.0*D.

7. The cyclone of claim 1, wherein at least one of either the deflection member or the outlet tube is movable within the housing such that the length of the gap is adjustable.

8. The cyclone of claim 1, wherein the outlet tube is movable within the housing such that the length of the bunker is adjustable.

9. A sulphur granulation system, comprising:
   a sulphur granulation processor coupled to a cyclone, wherein flue gas exhausted from the processor is received at an inlet of the cyclone;
   the cyclone, comprising:
      a cylindrical housing having an inner diameter D;
      the inlet near a first end of the housing;
      a deflection member positioned within and substantially coaxial to the first end of the housing; and
      an outlet tube positioned within and extending from a second end of the housing, the outlet tube substantially coaxial to the second end of the housing;
      an annular bunker formed between the outlet tube and an inner wall of the housing and configured to collect particles separated from an inlet gas stream;
      wherein a gap between the deflection member and the outlet tube has a length in the range of approximately 0.4*D to 0.8*D and wherein a length of the bunker is approximately greater than or equal to 1.5*D;
   a fan positioned downstream of and in fluid communication with the outlet tube such that the flue gas is drawn through the cyclone.

10. The system of claim 9, wherein an outlet gas exiting from the outlet tube includes less than 50 milligrams of emissions per kilogram of wet air.

11. The system of claim 9, further comprising:
    a steam jacket positioned about an exterior of the housing and configured to maintain a temperature within the cyclone such that sulphur droplets separated from the flue gas are maintained in a liquid state.

12. The system of claim 9, further comprising:
    a stack downstream of and in fluid communication with the outlet tube, wherein outlet gas exiting the outlet tube is vented to atmosphere through the stack.

13. The system of claim 9, wherein the bunker included in the cyclone includes a bunker outlet tube and wherein liquid sulphur collected in the bunker is transported from the cyclone through the bunker outlet tube for recycling back into the sulphur granulation processor.

14. A cyclone comprising:
    a cylindrical housing having an inner diameter D;
    an inlet near a first end of the housing;
    a deflection member positioned within and coaxial to a second end of the housing; and
    an outlet tube positioned within and extending from the first end of the housing, the outlet tube substantially coaxial to the housing;
    an annular bunker formed between the deflection member and an inner wall of the housing and configured to collect particles separated from an inlet gas stream;
    wherein a gap between the deflection member and the outlet tube has a length in the range of approximately 0.4*D to 0.8*D and wherein a length of the bunker is approximately greater than or equal to 1.5*D.

15. The cyclone of claim 14, wherein the inlet comprises a tangential inlet to the first end of the housing.

16. The cyclone of claim 15, wherein the cyclone does not include one or more vanes near the first end of the housing.

17. The cyclone of claim 14, wherein the cyclone further comprises:

a plurality of vanes included in the inlet at the first end of the housing.

18. The cyclone of claim 14, wherein the inlet is configured to receive a gas including sulphur droplets, the cyclone further comprising:

a steam jacket positioned about an exterior of the housing and configured to maintain a temperature within the cyclone such that the sulphur droplets are maintained in a liquid state.

19. The cyclone of claim 14, wherein a length of the deflection member is in the range of approximately 0.15*D to 1.0*D.

20. The cyclone of claim 14, wherein at least one of either the deflection member or the outlet tube is movable within the housing such that the length of the gap is adjustable.

* * * * *